United States Patent
Ellringmann et al.

(10) Patent No.: US 8,268,442 B2
(45) Date of Patent: Sep. 18, 2012

(54) ADHESIVE TAPE AND ITS USE

(75) Inventors: Kai Ellringmann, Hamburg (DE); Stephan Zöllner, Buchholz/Nordheide (DE); Thorsten Krawinkel, Hamburg (DE); Stefan Wulf, Mönchengladbach (DE)

(73) Assignee: TESA SE, Hamburg (DE)

( * ) Notice: Subject to any disclaimer, the term of this patent is extended or adjusted under 35 U.S.C. 154(b) by 1351 days.

(21) Appl. No.: 11/559,991

(22) Filed: Nov. 15, 2006

(65) Prior Publication Data

US 2008/0081186 A1 Apr. 3, 2008

(30) Foreign Application Priority Data

Feb. 22, 2006 (DE) .......................... 10 2006 008 561
Nov. 10, 2006 (DE) .......................... 10 2006 053 439

(51) Int. Cl.
*C09J 7/02* (2006.01)
*B65H 69/02* (2006.01)

(52) U.S. Cl. ..... 428/343; 428/40.1; 428/41.5; 428/41.9; 428/355 R; 428/355 BL; 428/355 AC; 428/906; 156/157

(58) Field of Classification Search .................. None
See application file for complete search history.

(56) References Cited

U.S. PATENT DOCUMENTS

| | | | |
|---|---|---|---|
| 3,573,146 A * | 3/1971 | Guinan et al. ................... 161/36 |
| 4,177,959 A | 12/1979 | Lancaster et al. | |
| 4,418,120 A * | 11/1983 | Kealy et al. ..................... 428/343 |
| 4,881,996 A * | 11/1989 | Nussbaum et al. ............. 156/157 |
| 6,007,910 A * | 12/1999 | Miller et al. ................. 428/355 R |
| 6,432,241 B1 | 8/2002 | Congard et al. | |
| 6,595,461 B1 | 7/2003 | Storbeck et al. | |
| 6,926,959 B2 * | 8/2005 | Kroll et al. ..................... 428/345 |
| 2002/0056784 A1 | 5/2002 | Davies et al. | |
| 2003/0190445 A1 * | 10/2003 | Nootbaar ....................... 428/40.1 |
| 2004/0075014 A1 | 4/2004 | Jacobs et al. | |

(Continued)

FOREIGN PATENT DOCUMENTS

DE  196 32 689 A1  2/1998

(Continued)

OTHER PUBLICATIONS

German Office Action.

*Primary Examiner* — Callie Shosho
*Assistant Examiner* — Cheng Huang
(74) *Attorney, Agent, or Firm* — Norris McLaughlin & Marcus, P.A.

(57) ABSTRACT

Adhesive tape suitable for flying splice of flat web material having non-polar surfaces which has been wound to form rolls, the adhesive tape comprising an upper self-adhesive composition (1, 11), a splittable carrier (2, 12) and a lower self-adhesive composition (3, 13) on the bottom face of the splittable carrier (2, 12), wherein as upper self-adhesive composition (1, 11) a silicone-free self-adhesive composition is used which has a bond strength to a polyethylene substrate of 1.5 N/cm or more (measurement method tesa test A) and an initial tack corresponding to a rolling distance of 200 mm or less (measurement method tesa test D), and as lower self-adhesive composition (3, 13) a self-adhesive composition is used which has a bond strength to a polyethylene substrate of 1.5 N/cm or more (measurement method tesa test A) and a complex viscosity of 10,000 Pa·s or more at 1 rad/s and 40° C. (measurement method tesa test F).

20 Claims, 2 Drawing Sheets

U.S. PATENT DOCUMENTS

2004/0260030 A1* 12/2004 Husemann et al. ........... 525/302
2005/0126688 A1 6/2005 Bean et al.
2005/0147813 A1 7/2005 Gotz et al.

FOREIGN PATENT DOCUMENTS

| | | |
|---|---|---|
| DE | 690 32 741 T2 | 7/1999 |
| DE | 198 41 609 A1 | 3/2000 |
| DE | 199 02 179 A1 | 8/2000 |
| DE | 699 08 182 T2 | 4/2004 |
| DE | 103 57 321 A1 | 7/2005 |
| EP | 11 04 795 A2 | 6/2001 |
| EP | 13 47 028 A2 | 9/2003 |
| WO | WO 91/08159 | 6/1991 |
| WO | WO 2005/054392 A1 | 6/2005 |

* cited by examiner

ADHESIVE TAPE AND ITS USE

The invention relates to an adhesive tape for flying splice of non-polar flat web material which has been found to form rolls, in accordance with the features of the preamble of the main claim, and also to a method of flying splice of non-polar flat web material that has been wound to form rolls.

In the processing of flat web material (paper, films, nonwovens or the like), flying splice is a common method of replacing an outgoing, almost unwound roll by a new roll without having to stop the high-speed machines. Splicing rolls on the fly in this way is frequently performed using pressure-sensitive adhesive tapes in order to join the end of the outgoing web to the start of the incoming web.

Performing a flying splice (also called "dynamic splice") is accomplished in the film-processing and nonwoven-processing industries, for materials having non-polar surfaces, by two different methods.

In the case of the first method, double-sided self-adhesive tapes are bonded manually to the start of the web of the new roll in an advantageous arrangement (usually linear, or w-shaped or v-shaped) and the web material protruding beyond the adhesive tape is separated off. Additionally the start of the web of the new roll is fastened using fastening labels (or "tabs") to the underneath turn of the new roll, in order to prevent the web unwinding when the new roll is accelerated to the circumferential speed of the old roll. Disadvantages with this method are that the preparation of the rolls is very time-consuming and the bonding requires the deployment of skilled personnel. Moreover, the method does not always lead to the desired results, since the bonds obtained in this way, as a result of the overlaying of web material, fastening labels and adhesive strips, are relatively thick. Furthermore, particularly in the case of thin, flexible web materials, the stream of air in the opposite direction that occurs in the course of rotation causes bulges to appear in the web material at the start of an incoming web, which can lead in general to poor bonding of the webs.

In the case of the second known method a single-sided self-adhesive tape is bonded overlappingly and in a straight line beneath the free end of the topmost web of the new roll, so that the adhesive side faces outwards and is only partly masked by the incoming web. The exposed part of the outwardly facing adhesive side is bonded to the web of the old roll. In order with this method to prevent the web unwinding when the new roll is accelerated to the superficial speed of the old roll, a liquid is introduced between the topmost turn of the new roll and the underlying turn, so that the top turn is fixed on the underlying turn by means of the capillary forces. Disadvantages here are that this method also requires the deployment of skilled personnel and yet does not always lead to technically advantageous results, since the efficiency of fastening of the web material by a liquid is dependent upon numerous parameters, examples being the surface energy, flexibility and basis weight of the film material, the amount of liquid employed, its polarity, viscosity and density, and also the thickness, surface area and shearing behaviour of the film of liquid. A decisive disadvantage of this method, moreover, is that the speed of the web at splice must not be too high and, moreover, that the plant and the web material are contaminated because of the liquid that is used.

The above method is also employed in the paper-processing industry. In that industry a development of the first method is the splicing method involving the integration of the tab used for fastening into the self-adhesive tape that joins the paper webs. After the webs have been joined, the splittable carrier serving as a tab undergoes splitting, so that part of the splittable carrier remains on the self-adhesive tape that joins the webs (i.e. on the top turn) while the other part remains on the underlying turn. Carriers referred to as "splittable" are those which can be split parallel to their two-dimensional extent, and especially carriers of the kind which also actually split, based on the requirements in a splicing method.

In order to carry out this method there are a good number of products known in the paper-processing industry. For instance DE 196 32 689 A2 discloses an adhesive tape which in addition to the principal carrier is equipped with a splittable paper carrier. Under the dynamic loads prevailing when the webs of two rolls are joined, the paper carrier splits and, with its remnants, non-adhesively masks the adhesive used for fastening, in a region which otherwise, with other adhesive tapes, remains exposed. DE 199 02 179 A1 likewise discloses an adhesive tape of this kind, in which the splittable paper carrier is arranged with an offset to the principal carrier, in order to prevent tears occurring under load.

In order to improve flying splice in the film-processing and nonwoven-processing industries it would be desirable to be able to use adhesive tapes of a structure similar to that of those already known from the paper-processing industry. This is an aim in particular for film materials and nonwoven materials having non-polar surfaces. Non-polar surfaces of this kind occur in the case of materials having a low surface energy, such as for polyethylene, for polypropylene, for polyethylene terephthalate (PET) or polymer-coated papers, for example. A low surface energy is one of 50 mN/m or less. For non-polar surfaces of this kind, self-adhesive compositions are needed which are of particularly high bond strength and at the same time of high tack. The high bond strength and high initial tack needed for this purpose is typically obtainable by raising the fluidity of the adhesive.

For flying splice in connection with non-polar film materials and nonwoven materials in the case of a splicing method, however, conventional high-strength and high-tack adhesives are poorly suited or not suitable at all. An increase in bond strength and in the initial tack of an adhesive goes hand in hand with an increase in its fluidity. Because of the high fluidity, an adhesive of this kind is pressed out from the adhesively equipped, splittable system, at the sides, and may even penetrate the splittable carrier, which overall can lead to blocking of the splittable system and to a failure of the spliced join. A further disadvantage is that the fluid adhesives can leave the bonded joint during the splicing operation, and therefore that residues of adhesive may remain, unmasked, in the system after the splittable carrier has been split.

It was an object of the invention, accordingly, to provide an adhesive tape having at least one upper self-adhesive composition, a splittable carrier and a lower self-adhesive composition on the bottom face of the splittable carrier, said tape being suitable for flying splice at high web speeds of non-polar flat web material wound to form rolls.

It has surprisingly been found possible to achieve this object by means of an adhesive tape suitable for flying splice of flat web material having non-polar surfaces, especially polyolefinic substrates, which has been wound to form rolls, wherein as upper self-adhesive composition a silicone-free self-adhesive composition is used which has a bond strength to a polyethylene substrate of 1.5 N/cm or more (measurement method tesa test A) and an initial tack corresponding to a rolling distance of 200 mm or less (measurement method tesa test D), and as lower self-adhesive composition a self-adhesive composition is used which has a bond strength to a polyethylene substrate of 1.5 N/cm or more (measurement method tesa test A) and a complex viscosity of 10,000 Pa·s or more at 1 rad/s and 40° C. (measurement method tesa test F).

For the flying splice it is of advantage in particular if the initial tack of the upper self-adhesive composition corresponds to a rolling distance of 50 mm or less (measurement method tesa test D).

In a splicing method the purpose of the upper self-adhesive composition is to join the top face of the adhesive tape of the invention to the start of the web of the new roll and to the almost unwound web of the old roll, thereby joining the webs of both rolls to one another by way of the adhesive tape. The purpose of the lower self-adhesive composition is to join the bottom face of the adhesive tape of the invention to the turn second from top, thereby initially joining the topmost and second-from-top turns of the new roll to one another by way of the adhesive tape. In the further course of the splicing method, as the splittable carrier splits, the join between the two top turns of the roll is parted again, in such a way that the adhesive regions of the upper self-adhesive composition and of the lower self-adhesive composition that face away from the top face of the respective turn remain non-adhesively masked by the carrier which has now undergone splitting.

Of substantial importance for the invention in this context is the specific design of the upper self-adhesive composition and of the lower self-adhesive composition in terms of their bond strength, initial tack, and viscosity. The inventive choice of the complex viscosity of the lower self-adhesive composition has the consequence of preventing cold flow of the lower self-adhesive composition. As a result of this it is impossible for the self-adhesive composition to escape from the bonded joint at the bottom face of the splittable carrier and to stick to the top face of the splittable carrier, and, as a result of this, blocking the carrier is prevented and the system continues to be splittable.

For the upper self-adhesive composition it is particularly advantageous to chose a composition which satisfies the requirements for a film splicing operation. Such a composition advantageously has a sufficient initial tack in order to attach effectively to non-polar materials, especially polyolefinic substrates in the splicing operation and in the operation a composition of this kind should not undergo shearing detachment from substrates of this kind—in other words, it should preferably have a good shear strength—and a composition of this kind develops sufficiently good bond strengths on the polyolefinic material.

The determination of the bond strength in this context was carried out as follows (tesa test A): the defined substrate (bond strength sheet) used was a polyethylene sheet which had been produced as a test sheet by injection moulding of Hostalen GC7260 HDPE pellets from Basell. Prior to measurement, this sheet was cleaned with ethanol. As the sample for investigation, a standard polyester carrier with a thickness of 23 μm was coated on one side with the respective self-adhesive composition (self-adhesive coatweight: 50 g/m$^2$). A strip of the coated standard polyester carrier 20 mm wide was pressed under load (2 kg) onto the substrate. Immediately thereafter the adhesive tape was peeled at an angle of 180° and a speed of 300 mm/min from the substrate, and the force required to achieve this at room temperature was measured. The measurement value (in N/cm) resulted as an average value from three individual measurements. The tesa test A measurement method was calibrated by using this measurement method to analyze a commercial test adhesive tape for testing non-adhesive coatings (tesa 7475 from tesa AG; specified bond strength to steel: 31.25 N/25 mm); the bond strength found in this case on the polyethylene test sheet was 4.5 N/cm.

In some cases comparative investigations were carried out on steel instead of polyethylene, with the experimental parameters otherwise identical (test A2).

The initial tack was determined as follows (tesa test D): the measure used for the initial tack with a very short contact time was the rolling-ball tack. As the sample for investigation, a standard polyester carrier with a thickness of 23 μm was coated on one side with the respective self-adhesive composition (self-adhesive coatweight: 50 g/m$^2$). A strip of the adhesive tape approximately 10 cm long was affixed horizontally, with the adhesive side upwards, on the test plane. A steel sample ball (diameter: 11 mm; mass: 5.6 g) was cleaned with acetone and conditioned for 2 hours under standard conditions (temperature: 23° C.+/−1° C.; relative humidity: 50%+/−1%). For the measurement, the steel ball was accelerated by rolling down a ramp which was 65 mm high (angle of inclination: 21°) under the Earth's gravity. From the ramp the steel ball was steered directly onto the adhesive surface of the sample. The distance traveled on the adhesive until the ball reached standstill was measured. The rolling distance determined in this way serves as an inverse measure of the initial tack of the self-adhesive composition (i.e. the shorter the distance, the higher the initial tack, and vice versa). The measurement value in each case resulted (as a reported length in mm) from the average value of five individual measurements.

The complex viscosity was determined as follows (tesa test F): the pressure-sensitive adhesive obtained in each case was analyzed in the form of a circular cylindrical test specimen having a diameter of 25 mm and a height of 0.8 mm in a deformation-controlled rheometer (RDA III, Rheometric Scientific; plate/plate geometry; measuring head: 2000 g Bendix) (preloaded with an axial force of 3 N). The dynamic measurement took place at 40° C. under standard conditions with a 3% deformation of the sample specimen in the frequency range from 0.1 to 500 rad/s, as the complex viscosity $\eta^*$. The numerical value reported as the "complex viscosity" [in Pa·s] is the amount of the complex viscosity measured at 40° C. in the low-frequency range (1 rad/s).

For the adhesive tape of the invention it is advantageous if as upper self-adhesive composition and/or lower self-adhesive composition a self-adhesive composition is used which has a bond strength to a polyethylene substrate of 3.0 N/cm or more (measurement method tesa test A), it being particularly advantageous if the bond strength to a polyethylene substrate is 5.0 N/cm or more. This produces particularly efficient attachment of the adhesive tape to the non-polar flat web material that is to be joined, thereby producing a further improvement in the stability of the join and hence in the efficiency of the splicing method as a whole.

It is additionally advantageous if the upper self-adhesive composition used is a self-adhesive composition which has an initial tack corresponding to a rolling distance of 40 mm or less (measurement method tesa test D), it being particularly advantageous if this rolling distance, used as a measure of the initial tack, is 20 mm or less. This produces particularly high efficiency with regard to the joining of the webs through the bringing-together of the two rotating rolls.

Compositions suitable for use as the upper self-adhesive composition include, in particular, all typical, silicone-free self-adhesive compositions with non-polar surfaces, with particular advantage those which have a high bond strength, a high initial tack and a high cohesion, particularly acrylates, natural rubber compositions and, with particular preference, adhesives based on styrene block copolymers. Particularly suitable in this context are non-repulpable self-adhesive compositions.

As upper self-adhesive compositions it is preferred to use those based on block copolymers, especially styrene block copolymers. Particularly suitable copolymers in accordance with the invention are those formed from polymer blocks of a vinylaromatic—with particular advantage, of styrene—(A blocks) and of polymer blocks formed by polymerization of 1,3-dienes (B blocks), such as butadiene or isoprene or a copolymer, for example. Said copolymer may, for example, be a copolymer of the aforementioned compounds butadiene and isoprene.

It is also possible for mixtures of different block copolymers to be employed. Products which have been partly or fully hydrogenated can be used as well.

Of advantageous usefulness for block copolymer mixtures, as one component, are block copolymers which have a linear A-B-A structure. With further advantage it is possible to use linear multiblock copolymers. Block copolymers which can be used with particular advantage are those of radial design, and also star-shaped multiblock copolymers.

As a further component it is preferred to use A-B diblock copolymers, particularly those based on the abovementioned A and B block monomers.

Hence it is particularly advantageous in accordance with the invention if as upper self-adhesive composition (1, 11) a self-adhesive composition based on a mixture of two or more styrene block copolymers is used, in which at least one of the copolymers is a diblock copolymer with one of the blocks based on styrene.

Examples of adhesives which can be used to good effect in accordance with the invention as the upper self-adhesive composition are diblock-containing styrene-isoprene-styrene (SIS) copolymers having the abovementioned styrene fractions and/or diblock fractions, of the kind available commercially, for example, under the trade name Europrene® SOL T-192 from EniChem (styrene fraction 25% by weight; diblock fraction 23% by weight).

Adhesives which have emerged as being particularly favourable as the upper pressure-sensitive adhesive are those which comprise at least one block copolymer mixture in which the styrene fraction is at least 25%, preferably 30%, by weight, and which possess a diblock fraction of at least 40%, preferably at least 60%, by weight. By this means it is possible in particular to realize good shear strength values.

Of outstanding suitability for use in accordance with the invention as the upper self-adhesive composition here are diblock-containing styrene-butadiene multiarm $(SB)_n$ copolymers having the abovementioned styrene fractions and diblock fractions, of the kind available commercially, for example, under the trade name Kraton® D118 (styrene fraction 33±2% by weight; diblock fraction approximately 78% by weight according to specification).

It is advantageous if the use concentrations for the block copolymer or block copolymer mixture are situated in a range between 30% and 70%, in particular in the range between 35% and 55%, by weight, based on the pressure-sensitive adhesive.

Particularly useful tackifiers are tackifier resins which are compatible with the elastomer block of the styrene block copolymers. Suitable tackifier resins include preferably non-hydrogenated or partially or fully hydrogenated resins based on rosin or rosin derivatives, hydrogenated polymers of dicyclopentadiene, non-hydrogenated, partially, selectively or fully hydrogenated hydrocarbon resins based on C-5, C-5/C-9 or C-9 monomer streams, or, with particular preference, polyterpene resins based on α-pinene and/or β-pinene and/or δ-limonene. Aforementioned tackifier resins can be used either alone or in a mixture.

The adhesive formulation additionally possesses with particular preference at least one tackifier resin which is liquid at room temperature.

Further additives which can be utilized with advantage, alone or in combination, include the following:
primary antioxidants, such as sterically hindered phenols,
secondary antioxidants, such as phosphites or thioethers,
in-process stabilizers, such as C-radical scavengers,
light stabilizers, such as UV absorbers or sterically hindered amines,
processing assistants,
endblock reinforcer resins.

It is advantageous, furthermore, if the tackifier resins used contain a high fraction of liquid resins, in particular a fraction of at least 25%, preferably at least 35%, by weight, based on the total amount of the resins employed.

A composition of this kind exhibits particularly favourable bond strength and initial tack. It is especially advantageous if the upper self-adhesive composition has a complex viscosity of 15,000 Pa·s or more.

The coatweight of the upper self-adhesive composition is typically chosen from the range from 30 to 100 $g/m^2$, in particular from the range from 35 to 70 $g/m^2$.

Suitable splittable carriers include all splittable sheetlike carrier materials, especially readily splitting papers, paper laminate systems (duplex papers and sized paper systems, for example), film laminate systems (sized film systems, for example), polymeric laminate systems (coextruded polymeric laminate systems, for example) and polymeric nonwovens. Typically a carrier is employed for which the splitting force totals 5 to 70 cN/cm, in particular 12 to 60 cN/cm.

It is necessary for the upper self-adhesive composition and the lower self-adhesive composition to have a high bond strength. In particular the bond strength of these self-adhesive compositions to the respective surfaces (carrier and web material to be bonded) must be greater than the force needed to split the splittable carrier. A particularly suitable lower self-adhesive composition is a resin-modified acrylate composition. Resin-modified or resin-blended compositions of this kind comprise a tackifier resin and an acrylate adhesive (with partial crosslinking). As the tackifier resin it is possible to use the typical tackifier resins, examples being terpene phenolic resins and rosins. The adhesives used as acrylate adhesives are acrylate-based copolymers of appropriate glass transition temperature, especially copolymers based on constituents which have the overall effect of making the copolymer softer (for example, low molecular mass acrylates of type $C_4$ to $C_{12}$ such as 2-ethylhexyl acrylate or n-butyl acrylate), and which likewise contain constituents which have the overall effect of making the copolymer harder (for example, acrylic acid or functionalized constituents such as glycidyl methacrylate or hydroxyethyl methacrylate). To modify the acrylate adhesive with the tackifier resin, the two compositions are mixed. Crosslinking is subsequently carried out according to customary crosslinking methods, such as in the form of a crosslinking reaction at high temperatures, or by using a suitable catalyst, examples being Lewis acids such as zinc chloride.

It is advantageous, furthermore, if as lower self-adhesive composition a self-adhesive composition is used which has having a complex viscosity of 12,000 Pa·s or more (measurement method tesa test F), in particular of 15,000 Pa·s or more. This embodiment is particularly efficient at preventing blocking of the splittable system and hence failure of the spliced join.

It is likewise advantageous if as lower self-adhesive composition a resin-modified acrylate adhesive is used, it being especially advantageous if this adhesive comprises 70% to 80% by weight of acrylate adhesive and 20% to 30% by weight of tackifier resin. In particular it is advantageous in this case to use as tackifier resin a terpene phenolic resin and/or as acrylate adhesive a copolymer of 48.5% by weight of n-butyl acrylate, 48.5% by weight of 2-ethylhexyl acrylate, 2% by weight of glycidyl methacrylate and 1% by weight of acrylic acid. Compositions of this kind have a high bond strength than non-polar surfaces and nonwovens and at the same time ensure the splittability of the splittable carrier, in so far as, on account of their relatively low fluidity, they neither penetrate the splittable carrier nor are pressed out of the bonded joint.

In principle the upper self-adhesive composition and the lower self-adhesive composition selected may also be identical, in the form for instance of the above, resin-modified acrylate composition. In this extraordinarily favourable case the risk of blocking of the splittable system is particularly low. The upper and lower self-adhesive compositions can also be used for example identically in the form of silicone-free self-adhesive compositions, particularly as described above, on the basis for example of block copolymers.

The constructions of the adhesive tapes of the invention can be realized in different forms. Reference may be made in particular to the following publications, whose disclosure content is imported in its entirety into the disclosure content of this specification:

DE 196 32 689 A2 (Beiersdorf), especially construction of FIG. 1 and the explanatory material in column 3, lines 31 to 44, the adhesive arranged at the top therein (3; between the carrier 2 and the liner 4) being substituted by the present upper adhesive (1, 11) and/or the lower adhesive therein (likewise designated as 3) being substituted by the present lower adhesive (3, 13);

DE 199 02 179 A1 (Beiersdorf), especially construction of FIG. 1 and the explanatory material in column 3, lines 31 to 44, the adhesive N1 therein being substituted by the present upper adhesive (1, 11) and/or the adhesive N3 therein being substituted by the present lower adhesive (3, 13), and it also being possible for the adhesive N2 therein to be substituted by one of the present adhesives (1, 11, 3, 13);

WO 91/08159 A1 (Norrman), especially construction of FIG. 1 and the explanatory material at page 2 line 35 to page 4 line 14, the adhesive 3 therein being substituted by the present upper adhesive (1, 11) and/or the adhesive 4 therein being substituted by the present lower adhesive (3, 13);

DE 19841 609 A1 (Prinz), especially constructions of FIG. 1 and the explanatory material in column 3 lines 7 to 37, the adhesive 34 therein being substituted by the present upper adhesive (1, 11) and/or the adhesive 32 therein being substituted by the present lower adhesive (3, 13);

US 2004/0075014 A1 (Jacobs et al.), especially constructions of FIG. 1 and the explanatory material in paragraphs [0049] to [0054], the adhesive 3 therein being substituted by the present upper adhesive (1, 11) and/or the adhesive 2 therein being substituted by the present lower adhesive (3, 13);

US 2005/0126688 A1 (Bean et al.), especially constructions of FIGS. 2a, 2b, 2c and 2d and the explanatory material in paragraphs [0024] to [0037], the adhesives 20 and 20a therein being substituted by the present upper adhesive (1, 11) and/or the adhesive 30a and 30b and 30c therein being substituted by the present lower adhesive (3, 13);

U.S. Pat. No. 6,432,241 B1 (Congard et al.) especially construction of FIGS. 1 and 2 and the explanatory material in column 3 lines 52 to 64 and column 4 line 34 to column 6 line 53, the adhesives 12 therein being substituted by the present upper adhesive (1, 11) and/or the adhesive 15 therein being substituted by the present lower adhesive (3, 13);

US 2002/0056784 A1 (Davies et al.), especially constructions of FIG. 2 and the explanatory material in paragraphs [0038] to [0052], the adhesives 16 therein being substituted by the present upper adhesive (1, 11) and/or the adhesive 24 therein being substituted by the present lower adhesive (3, 13);

though without wishing to subject the invention to any unnecessary restriction as a result of the reference to the aforementioned embodiments.

It is especially advantageous if the adhesive tape comprises a non-splittable carrier whose top face is coated with the upper self-adhesive composition and whose bottom face is joined completely or at least partly to the top face of the splittable carrier. Using a non-splittable carrier, which joins the web of the old roll to the start of the web of the new roll before and also after-splitting of the splittable carrier, produces a particularly robust join between the two webs, and further increases the efficiency of the splicing method. It is particularly advantageous in this context if the bottom face of the non-splittable carrier is joined (wholly or partly) to the top face of the splittable carrier by way of a joining self-adhesive composition (five-ply construction). This join may be made arbitrarily in principle, using for example a self-adhesive composition, a curing hot-melt adhesive and the like.

Using a mechanically stable, non-splittable carrier sharply increases the efficiency of the bonding of the web of the old roll to the start of the web of the new roll in the splicing method. Principal carriers used can be all typical sheetlike carrier materials for adhesive tapes, examples being paper carriers made from smooth base paper coated on one or both sides, and also film carriers, such as BOPP films, PET films, aluminized PET films and aluminium foils. It is desirable in this context for the principal carrier to be of high tensile strength. As the joining self-adhesive composition it is possible to use any typical self-adhesive composition. It is favourable, however, if the joining self-adhesive composition chosen and the lower self-adhesive composition chosen are identical, in the form for instance of a resin-modified acrylate composition, since in this case the risk of blocking of the splittable system is particularly low.

Accordingly, over the entire length of the adhesive bond and hence also over the entire length of the adhesive tape, the adhesive tape has a splittable carrier. The splittable carrier may extend over the whole width of the non-splittable carrier. It is favourable, however, if the width of the splittable carrier is less than the overall width of the adhesive tape, so that fastening to the underlying web takes place only in a small part of its width. It is particularly favourable in this context if the splittable carrier does not finish flush with the non-splittable carrier but is instead attached to the latter with an indent on its bottom face. In the course of the splicing method, this reduces the risk of tears occurring still further.

The invention further embraces the use of the adhesive tape of the invention for bonding flat web material, having non-polar surfaces and which has been wound to form rolls, in the course of a flying splice, in particular of films and/or nonwovens. Using the adhesive tape produces a significant overall increase in the efficiency of the splicing method.

Finally the invention offers a splicing method for flying splice of non-polar flat web material which has been wound to form rolls, especially films and/or nonwovens, wherein the adhesive tape of the invention is adhered (at least partly) behind the end of the topmost web of a new roll of a non-polar flat web material, while the bottom face of the adhesive tape is bonded to the underneath web of the new roll and thereby secures it, after which the new roll thus equipped is placed adjacent to an almost entirely unwound roll that requires replacement, and is accelerated to the same superficial speed, and then the new roll is pressed against the topmost web of the old roll, the exposed self-adhesive composition of the adhesive tape being bonded to the old web when the webs have substantially the same speeds, while at the same time the splittable system splits, and non-adhesively masks the self-adhesive compositions of the splittable system with the two split remnants of the splittable carrier.

BRIEF DESCRIPTION OF DRAWINGS

In the text below, the invention will be described in greater detail with reference to the figures, of which

Figure 1:
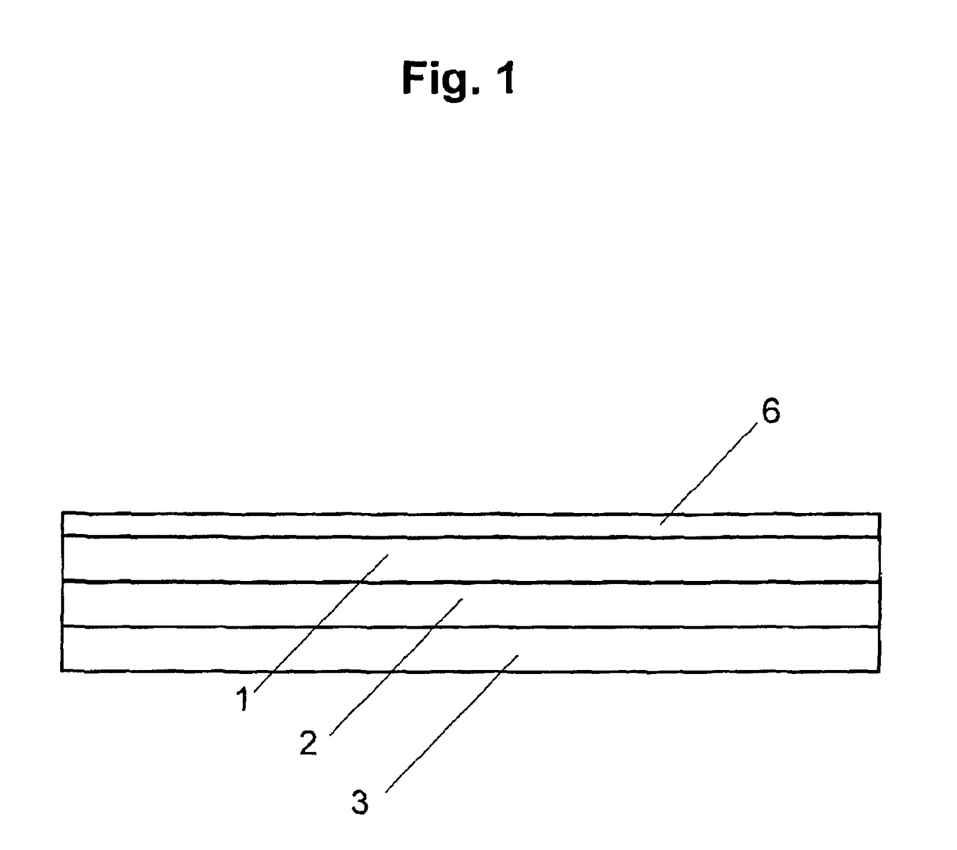
FIG. 1 shows a schematic side view of an embodiment of the adhesive tape of the invention (three-ply construction, shown transverse to the longitudinal direction of the adhesive tape)

FIG. 1 shows an adhesive tape of the invention suitable for flying splice of flat web material having non-polar surfaces which has been wound to form rolls. The adhesive tape takes the form of a three-ply construction comprising the splittable carrier 2 coated on its top face with the upper self-adhesive composition 1 and on its bottom face with the lower self-adhesive coat 3. A construction of this kind can be employed when the splittable carrier 2 has sufficient mechanical robustness along its two-dimensional extent to be able to withstand the loads which occur when the web of the almost fully unwound roll is joined to the start of the web of the new roll.

The adhesive tape further comprises a release system 6 for the non-adhesive masking of the upper self-adhesive composition 1, so that the adhesive top face of the adhesive tape is protected in storage. As the release system it is possible to use all conventional release papers, siliconized release papers for instance, or siliconized release films. The release system may be configured here in one part or in a plurality of parts (not shown in FIG. 1).

Figure 2:
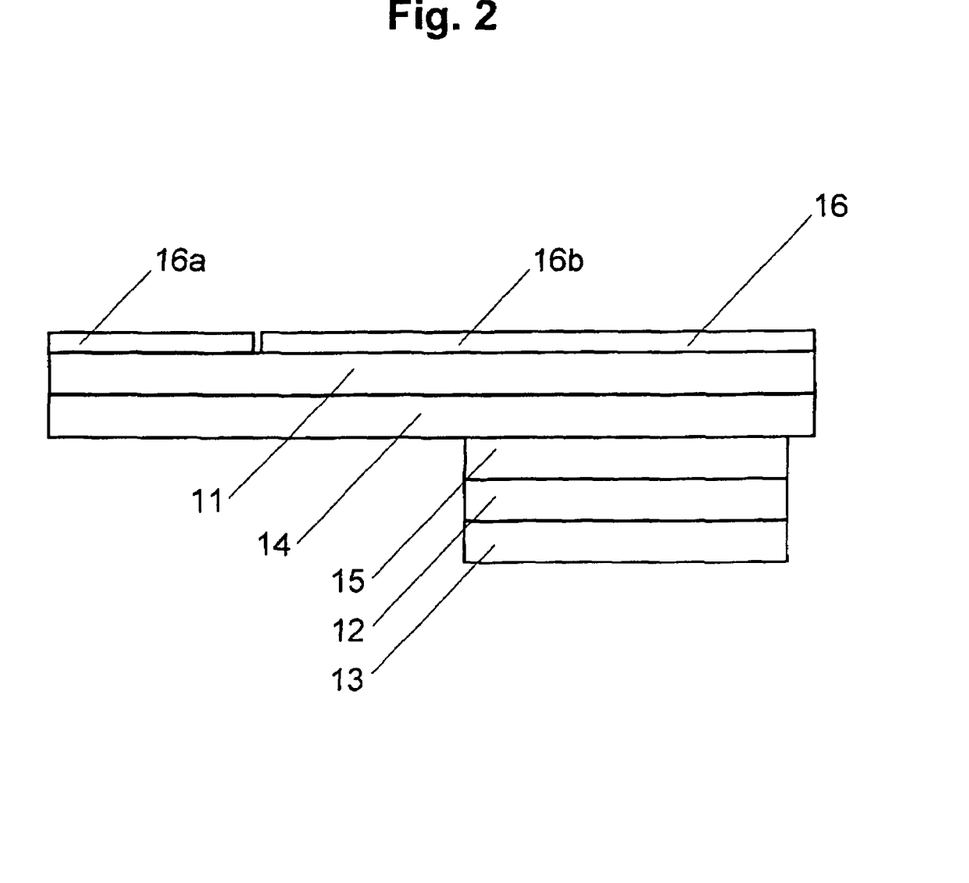
FIG. 2 shows a schematic side view of a further embodiment of the adhesive tape of the invention (five-ply construction, shown transverse to the longitudinal direction of the adhesive tape).

FIG. 2 shows a further particularly favourable embodiment of the adhesive tape of the invention in the form of a five-ply construction. This embodiment of the adhesive tape system comprises a splittable carrier 12 and a non-splittable carrier 14, which are joined to one another. The join here takes the form of a separate, joining self-adhesive composition 15, which joins the top face of the splittable carrier 12 to a part of the bottom face of the non-splittable carrier 14. Accordingly the non-splittable carrier 14 is coated on its top face with the upper self-adhesive composition 11 and on part of its bottom face with the joining self-adhesive composition 15, which anchors the splittable carrier 12 on the non-splittable carrier 14. In this case the splittable carrier 12 is arranged with an offset or indent relative to the non-splittable carrier 14.

The embodiment shown in FIG. 2 additionally has a release system 16 for the non-adhesive masking of the upper self-adhesive composition 11, for which all conventional release papers can be used, siliconized release papers for instance, or siliconized release films. Particularly advantageous is the two-part release system 16a/16b shown here, which is divided in the longitudinal direction into a back masking part 16a and a front masking part 16b, by means for instance of a perforation or a slit. This has the advantage that the adhesive tape can first of all be bonded to the start of the web of the new roll, with only the adhesive region of the adhesive tape being exposed beneath the back masking part 16a, and the adhesive region, for bonding with the web of the old roll, continuing to be masked by the front masking part 16b and hence remaining protected.

In order to illustrate the second embodiment of the adhesive tape of the invention, a specific design is set out below by way of example:

EXAMPLE 1

An inventive adhesive tape having a width of 50 mm was produced from a machine-finished base paper having a basis weight of 54 g/cm$^2$ and a thickness of 66 μm, as non-splittable carrier 14. The top face of the non-splittable carrier 14 is coated with an upper self-adhesive composition 11.

The upper self-adhesive composition 11 used was a synthetic rubber based on styrene block copolymer, its composition being as follows: 48% by weight of a styrene-butadiene-styrene block copolymer (Kraton D1118 from Kraton), 24% by weight of an alpha-pinene resin (Dercolyte A 115 from DRT, softening point 115° C.), 27% by weight of a liquid hydrocarbon resin (Wingtack 10 from Goodyear—liquid synthetic aliphatic C-5 polyterpene/hydrocarbon resin; softening point 10° C.), 0.5% by weight of a primary antioxidant (Irganox 1010 from Ciba) and 0.5% by weight of a secondary antioxidant (Weston 339 from Interorgano).

The adhesive tape further comprises the splittable carrier 12 and also a lower self-adhesive composition 13 and a joining self-adhesive composition 15. The splittable carrier 12 used was a paper having a basis weight of 51 g/cm$^2$ and a thickness of 90 μm. The width of the splittable carrier 12 was 12 mm.

In addition the adhesive tape has a two-part release system 16 for the non-adhesive masking of the upper self-adhesive composition 11, so that the adhesive top face is protected during storage of the inventive adhesive tape. This release system 16 was produced from siliconized release paper and comprises a back masking part 16a, which masks the part of the adhesive tape that is joined to the topmost ply of the web of the new roll, and a front masking part 16b, which masks the part of the adhesive tape that is joined to the web of the old roll. Both masking parts are separated from one another by a slit which runs in the longitudinal direction of the adhesive tape.

As the lower self-adhesive composition 13 and joining self-adhesive composition 15, identical self-adhesive compositions were used, their composition being as follows: 75% by weight of an acrylate-based polymer (as acrylate adhesive) and 25% by weight of a terpene phenolic resin (as tackifier resin).

The terpene phenolic resin used was the product DT110 from DRT. The acrylate-based polymer used was a copolymer of 48.5% by weight n-butyl acrylate, 48.5% by weight 2-ethylhexyl acrylate, 2% by weight glycidyl methacrylate and 1% by weight acrylic acid. This polymer had a mass-average molar mass of 950,000 g/mol and a polydispersity D of 8.7 (determined from the results of gel permeation chromatography on 100 μl of sample which had been subjected to clarifying filtration (containing 150 μg of copolymer in solution in tetrahydrofuran), using tetrahydrofuran as eluent (0.5 ml/min), a preliminary column (PSS SDV 10 μm, ID 8*50 mm) and a separating column (PSS SDV 10 μm linear one, 1 D 8*300 mm) from the company Polymer Standards Service, and a differential refractometer (Shodex R171) for detection; calibration with narrow-distribution polystyrene standard (PSS Ready Cals; Polymer Standards Service); conversion of the polystyrene calibration into a polymethyl methacrylate calibration using the Mark-Houwink coefficients for polystyrene (K=0.0136; a=0.7140) and polymethyl methacrylate (K=0.0126; a=0.6880)). For the purpose of crosslinking, 0.3% by weight of zinc chloride, as a Lewis acid, was added to the mixture, based on the dry mass of the copolymer, and the mixture was dried at 120° C. for 15 minutes.

First of all the technical adhesive properties of the upper self-adhesive composition 11 and of the lower self-adhesive composition 13, and also of the joining self-adhesive composition 15, were investigated, by determining the bond strength of the self-adhesive compositions to a polyethylene substrate (measurement method tesa test A), by determining their initial tack on the basis of the rolling-ball tack (measurement method tesa test D), and by determining their complex viscosities (measurement method tesa test F).

Also investigated were the technical adhesive properties of the adhesive tape produced using the self-adhesive compositions 11, 13 and 15. For this purpose, on the one hand, the shear strength of the adhesive tape was determined on a polyethylene backing in the form of the holding power (tesa test B). For this purpose a strip of the adhesive tape with a width of 13 mm and a length of 20 mm was applied to a polyethylene test sheet, which had been cleaned with ethanol beforehand, and was pressed onto the carrier four times with a constant applied pressure. The adhesive tape was loaded with 1 kg at room temperature and the holding power (in minutes) was determined as an average value from three measurements.

In addition, the relative splitting behaviour of a splittable carrier coated on both sides with the respective self-adhesive compositions was investigated (tesa test C). The comparison value used for this purpose was the splitting behaviour of a splittable carrier which had not been coated with self-adhesive compositions. For measurement, strips of the coated and non-coated carrier 12 cm long were first stored under load (2 kg/cm²) at 40° C. for 24 hours. For the purpose of measurement, the carriers were initially split to a length of 2 cm and a measurement was made of the force required in each case to continue to split the carriers with a splitting speed of 300 mm/min. A pass was scored in the test if the difference in force required for continued splitting between the coated and the non-coated carrier was less than 20%.

The results of the investigations are reproduced in Table 1 with reference to the respective test method (tesa test) for the upper self-adhesive composition 11, on the one hand, and for the lower self-adhesive composition 13/joining self-adhesive composition 15, on the other.

TABLE 1

| Self-adhesive composition (reference numeral) | Bond strength [N/cm] (test A) | Holding power [min] (test B) | Relative splitting behaviour (test C) | Rolling distance [mm] (test D) | Complex viscosity [Pa·s] (test F) |
|---|---|---|---|---|---|
| upper (11) | 8.2 | >10 000 | — | 4 | 25 000 |
| lower (13) / joining (15) | 2.0 | >10 000 | pass | 40 | 16 000 |

A number of further inventive adhesive tapes were produced by a method analogous to that of Example 1 and subjected to measurement, the upper adhesive in these tapes being based on the following compositions (overall composition of the adhesive: 99% base adhesive, 0.5% by weight primary antioxidant (Irganox 1010 from Ciba) and 0.5% by weight secondary antioxidant (Weston 339 from Interorgana), corresponding to Example 1). In this regard, compare Table 2.

TABLE 2

| | Base composition upper self-adhesive Ex. (11) | Bond strength [N/cm] Steel (test A2) | Bond strength [N/cm] PE (test A) | Holding power [min] (test B) | Rolling distance [mm] (average value from three measurements) (test D) |
|---|---|---|---|---|---|
| 2 | 45% Kraton D1118, 25% Dercolyte A115, 30% Wingtack 10 | 11.6 | 10.8 | 8023 | 3 |
| 3 | 45% Kraton D1118, 30% Dercolyte A115, 25% Wingtack 10 | 14.0 | 12.4 | 2750 | 27 |
| 4 | 50% Kraton D1118, 30% Dercolyte A115, 20% Wingtack 10 | 14.0 | 11.0 | 14963 | 8 |
| 5 | 50% Kraton D1118, 25% Dercolyte A115, 25% Wingtack 10 | 8.8 | 8.8 | 6337 | 2 |
| 6 | 45% Europrene SOL T-192, 25% Dercolyte A115, 30% Wingtack 10 | 11.8 | 8.0 | 4809 | 12 |
| 7 | 45% Europrene SOL T-192, 25% Dercolyte A115, 30% Wingtack 10 | 11.8 | 8.0 | 4809 | 12 | all trade names: ®

The use of adhesive tapes produced in this way for the flying splice of polyethylene films with a thickness of 35 μm to 60 μm was successful in practical testing.

The invention claimed is:

1. Adhesive tape suitable for flying splice of flat web materials having non-polar surfaces, which flat web materials have been wound to form rolls,
    the adhesive tape comprising an upper self-adhesive composition, a splittable carrier and a lower self-adhesive composition on a bottom face of the splittable carrier, wherein
    the upper self-adhesive composition is a silicone-free self-adhesive composition that has a bond strength to a polyethylene substrate of 1.5 N/cm or more (measurement method tesa test A) and an initial tack corresponding to a rolling distance of 50 mm or less (measurement method tesa test D),
    and the lower self-adhesive composition is a self-adhesive composition that has a bond strength to a polyethylene substrate of 1.5 N/cm or more (measurement method tesa test A) and a complex viscosity of 10 000 Pa·s or more at 1 rad/s and 40° C. (measurement method tesa test F).

2. Adhesive tape according to claim 1, wherein the upper self-adhesive composition and/or the lower self-adhesive composition is a self-adhesive composition that has a bond strength to a polyethylene substrate of 3.0 N/cm or more (measurement method tesa test A).

3. The adhesive tape of claim 2, wherein said bond strength is 5.0 N/cm or more.

4. Adhesive tape according to claim 1, wherein the upper self-adhesive composition is a self-adhesive composition that has an initial tack corresponding to a rolling distance of 40 mm or less (measurement method tesa test D).

5. The adhesive tape of claim 4, wherein said initial tack corresponds to a rolling distance of 20 mm or less.

6. Adhesive tape according to claim 1, wherein the lower self-adhesive composition is a self-adhesive composition that has a complex viscosity of 12 000 Pa·s or more (measurement method tesa test F).

7. Adhesive tape according to claim 1, wherein the upper self-adhesive composition is a synthetic rubber composition.

8. Adhesive tape according to claim 7, wherein the synthetic rubber composition comprises 45% by weight of a styrene-isoprene-styrene block copolymer, 39% by weight of a rosin ester, 15% by weight of a liquid hydrocarbon resin, 0.5% by weight of a primary antioxidant and 0.5% by weight of a secondary antioxidant.

9. Adhesive tape according to claim 1, wherein the upper self-adhesive composition is a self-adhesive composition based on block copolymers.

10. Adhesive tape according to claim 9, wherein the upper self-adhesive composition is a self-adhesive composition based on a mixture of two or more styrene block copolymers comprising at least one diblock copolymer with one of the blocks based on styrene.

11. Adhesive tape according to claim 10, wherein the upper self-adhesive composition comprises a styrene fraction that is at least 25% by weight and/or a diblock fraction that is at least 40% by weight, based on the total amount of block copolymer.

12. The adhesive tape of claim 11, wherein said styrene fraction is at least 30% and said diblock fraction is at least 60% by weight.

13. Adhesive tape according to claim 1, wherein the lower self-adhesive composition is a resin-modified acrylate adhesive.

14. Adhesive tape according to claim 13, wherein the resin-modified self-adhesive composition is a self-adhesive composition comprising 70% to 80% by weight of acrylate adhesive and 20% to 30% by weight of tackifier resin.

15. Adhesive tape according to claim 14, wherein the tackifier resin is a terpene phenolic resin and/or the acrylate adhesive is a copolymer of 48.5% by weight n-butyl acrylate, 48.5% by weight 2-ethylhexyl acrylate, 2% by weight glycidyl methacrylate and 1% by weight acrylic acid.

16. Adhesive tape according to claim 1, further comprising a non-splittable carrier, a top face of the non-splittable carrier being coated with the upper self-adhesive composition, and at least one part of the bottom face of the non-splittable carrier being drawn into the top face of the splittable carrier.

17. Adhesive tape according to claim 16, further comprising a joining self-adhesive composition that joins the at least one part of the bottom face of the non-splittable carrier to the top face of the splittable carrier.

18. Adhesive tape according to claim 1, wherein the upper self-adhesive composition and/or the lower self-adhesive composition is a self-adhesive composition that has a complex viscosity of 15 000 Pa·s or more (measurement method tesa test F).

19. A method for bonding flat web materials having non-polar surfaces, which flat web materials been wound to form rolls, in the course of a flying splice, said method comprising bonding said materials with the adhesive tape of claim 1 during the course of said flying splice.

20. A splicing method for performing a flying splice of non-polar flat web materials that have been wound to form rolls, said method comprising adhering the adhesive tape according to claim 1 at least partially behind an end of a topmost web of a new roll or a non-polar flat web material, while bonding a bottom face of the adhesive tape to an underneath web of the new roll and thereby securing it, and placing the new roll thus equipped adjacent to an almost entirely unwound unwinding roll that requires replacement, and accelerating the new roll to the same superficial speed as the unwinding roll, and then pressing the new roll against the topmost web of the unwinding roll, bonding an exposed self-adhesive composition of the adhesive tape to the unwinding web when the webs have substantially the same speeds, while at the same time splitting the splittable system, and non-adhesively masking the self-adhesive compositions of the splittable system with split remnants of the splittable carrier.

* * * * *